Figure 1:
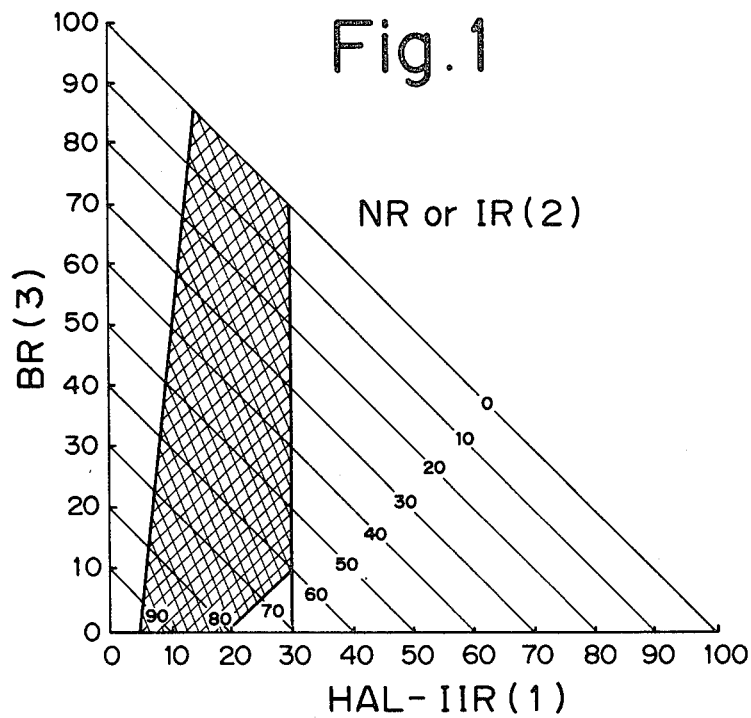

United States Patent [19]

Ahagon et al.

[11] 4,342,670

[45] Aug. 3, 1982

[54] PROCESS FOR PREPARING RUBBER COMPOSITIONS FOR TIRE TREADS

[75] Inventors: Asahiro Ahagon; Makoto Misawa, both of Hiratsuka; Hiroshi Hirakawa, Isehara, all of Japan

[73] Assignee: The Yokohama Rubber Co., Ltd., Tokyo, Japan

[21] Appl. No.: 177,689

[22] Filed: Aug. 13, 1980

[30] Foreign Application Priority Data

Aug. 24, 1979 [JP] Japan .................................. 54-107083

[51] Int. Cl.³ .............................................. C08J 3/00
[52] U.S. Cl. ................................. 523/353; 152/330 R; 525/236; 524/526
[58] Field of Search ..................... 260/42.56, 5, 42.47; 525/236

[56] References Cited

U.S. PATENT DOCUMENTS 3,830,274 8/1974 Waser ..................................... 260/5

OTHER PUBLICATIONS

*Rubber Chemistry and Technology*, vol. 47, pp. 48-56, (1974).
*Chemical Abstracts*, "Rubber Mixtures", Grasso; et al., 81-64987g, (1974).

*Primary Examiner*—Wilbert J. Briggs, Sr.
*Attorney, Agent, or Firm*—Jordan and Hamburg

[57] ABSTRACT

A process for preparing a rubber composition for tire treads having resilience, wet skid resistance and wear resistance well balanced with each other, by mechanically mixing a specific amount in total of a halogenated butyl rubber, natural rubber or a polyisoprene rubber and a polybutadiene rubber with a specific amount of carbon black and with other additives in the first mixing step and then mechanically mixing the resulting mixture with the remainder of the rubber ingredients and carbon black in the second mixing step thereby to obtain the rubber composition.

3 Claims, 10 Drawing Figures

FINAL BLENDING RATIO
CL-IIR/NR/BR = 15/70/15

FINAL BLENDING RATIO
CL-IIR/NR/BR = 20/50/30

FINAL BLENDING RATIO
CL-IIR/NR/BR = 25/40/35

FINAL BLENDING RATIO
CL-IIR/NR/BR = 20/30/50

Note: E. = Example
C. = Comparative example
R. = Reference example

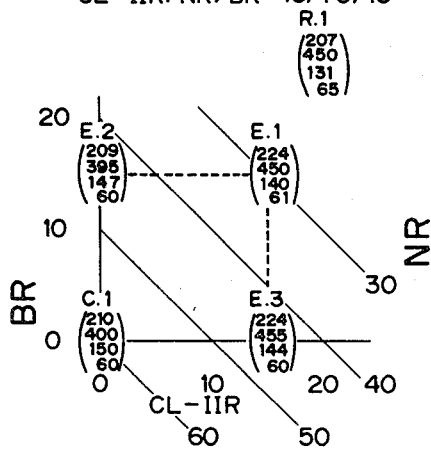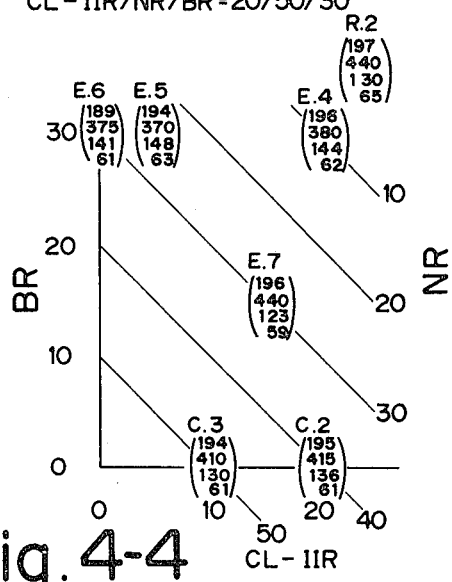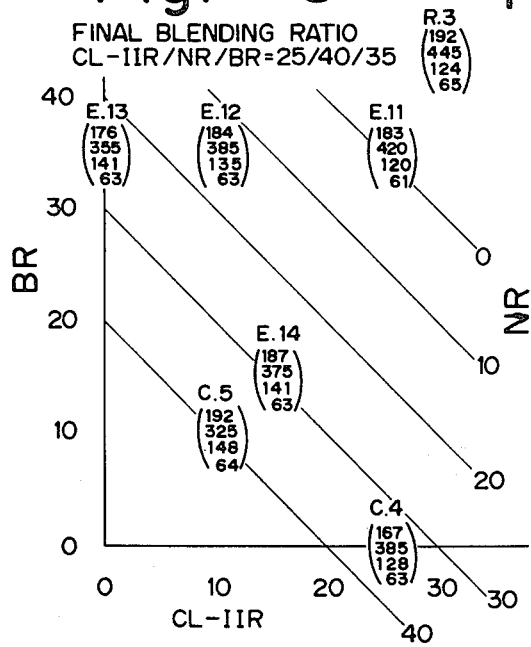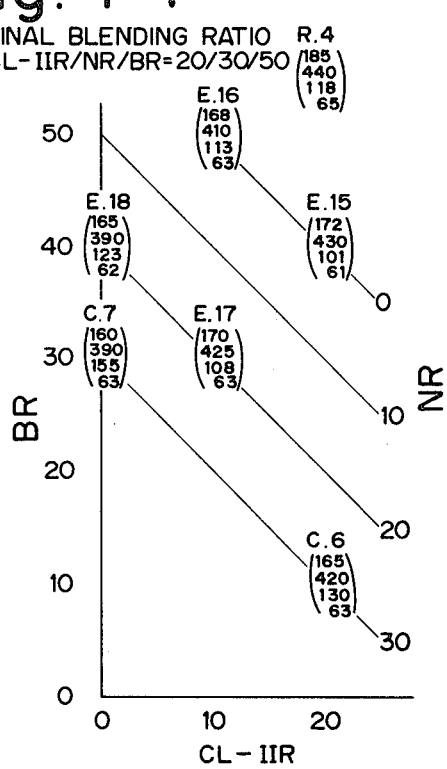

PROCESS FOR PREPARING RUBBER COMPOSITIONS FOR TIRE TREADS

This invention relates to a process for preparing a rubber composition for tire treads and more particularly to such a composition obtained by the two-step mixing of specific rubber ingredients with carbon black and other additives.

There have recently been sought automobile tires which enable automobiles fitted therewith to run with a high fuel consumption efficiency and particularly have low rolling resistance.

In conventional processes for preparing tires, there have been raised problems that an attempt to decrease rolling resistance in the resulting tires will result in decreasing wet braking performance thereof, while an attempt to improve the wet braking performance of the resulting tires will increase the rolling resistance thereof. These properties or characteristics of tires are considered to depend greatly on the energy loss characteristic of the rubber components of treads of the tires and, thus, it has heretofore been considered from experiences that a decrease in rolling resistance of tires and an improvement in wet braking performance and wear resistance thereof are conflicting with each other.

To obtain tires having low rolling resistance, the tread rubber portion of the tires is required to be such that an energy loss, which is caused by the load applied to the tire portion contacting with the road surface during the run of the tires and also by the repeated deformation due to the rotation of the tires, is small. In tests on rubber materials, dynamic loss properties such as resilience, may be indicative of rolling resistance. In addition, it is necessary to evaluate this resilience at a temperature of about 70° C. in view of the actual running state of the tires.

To improve tires in wet skid resistance, which is braking performance on a wet road and is important from the view-point of safety, the tread rubber portion of the tires should be such that an energy loss, as frictional resistance, caused by the deformation of the tread of the tires in compliance with the surface unevenness of a road when the tires are run on the road while being braked, is great.

In addition to the rolling resistance and wet braking performance of the tires, the wear resistance thereof is also an important property from the economical viewpoint of the tires. It has been eagerly sought to develop a rubber composition for use in the production of tire treads having their rolling resistance and wet braking performance balanced with each other without appreciable degradation in wear resistance and also develop a process for preparing such a rubber composition in order to attain the economization of energy and resources.

The present inventors made various researches in an attempt to obtain a rubber composition for use in the production of tire treads which meet the said requirements.

Among others, their particularly detailed research was made in the combined use of natural rubber, a diene type synthetic rubber and a halogen-containing polyisobutylene isoprene rubber (hereinafter referred to as "halogenated butyl rubber") as disclosed in publications such as "Improvement Of Tire Traction With Chlorobutyl Rubber" in "Tire Science And Technology", 1(2) May (1973), pp. 190-201. As the result of this particularly detailed research, it has been found that a blend comprising, as the three main rubber ingredients and in a specific blending ratio, (1) a halogenated butyl rubber, (2) natural rubber or a polyisoprene rubber containing at least 90% of cis-1,4-bonding units and (3) a polybutadiene rubber containing less than 20% of 1,2-bonding units, will give desired tire treads having said properties (low rolling resistance and high wet braking performance) and acceptable wear resistance. Based on this finding, a Japanese patent application was filed under application No. 42011/79 (filing date: Apr. 9, 1979).

The selection of rubber ingredients of a desired rubber composition for tire treads has been made on the basis of said finding, whereby development of the desired tire treads has been attained to a certain extent. However, it has still been sought to prepare a rubber composition which will produce therefrom desired tire treads having further improved resilience.

An object of this invention is to provide a process (comprising two different steps) for the preparation of a rubber composition which, when cured, will give tire treads having both low rolling resistance and high wet braking performance without appreciable degradation in wear resistance, the said three properties being well balanced. This balancing is not such that it may be obtained by the use of conventional processes.

The present inventors made studies of processes for preparing a rubber composition (for tire treads) containing the rubber ingredients as disclosed in said Japanese patent application No. 42011/79 and, as a result of their studies, their attention was drawn to the fact that specific two-step mixing methods as disclosed in Japanese Patent Application Laid-Open Gazette No. 112445/75, "Rubber Chemistry And Technology" Vol. 47, p. 48 (1974) and the like, are effective in preparing a rubber composition which will produce therefrom tire treads having various improved properties.

It has thus been found that a rubber composition which will give tire treads having unexpected remarkably improved resilience, wet skid resistance and acceptable wear resistance, the three properties being well balanced, may be obtained by subjecting to specific two-step mixing, (I) rubber ingredients comprising (1) a halogenated butyl rubber, (2) natural rubber or a polyisoprene rubber and (3) a polybutadiene rubber as well as (II) carbon black and conventional additives, thus accomplishing the present invention.

The process of the present invention will be detailed below.

In a process for preparing a rubber composition for tire treads by mechanically mixing (1) at least one member selected from halogenated butyl rubbers, (2) natural rubber or a polyisoprene rubber and (3) a polybutadiene rubber, the rubbers (1) to (3) totalling 100 parts by weight, with 40-70 parts by weight of carbon black as well as with a vulcanization accelerator, sulphur and the like, said process characterized by firstly mechanically mixing 40-70 parts of rubber ingredients containing at least 50% by weight of the total of the rubbers (1) and (3) with at least 90% by weight of the total of the carbon black to form a mechanically mixed mass and then secondly mixing the thus formed mixed mass with the remaining rubber ingredients and carbon black to obtain the rubber composition for tire treads.

It has surprisingly been found that this specific two-step mixing will result in obtaining a rubber composition for tire treads, which, when cured, will produce tire treads having remarkably improved resilience and equal or superior wet skid resistance to those obtained from a rubber composition prepared from the same ingredients as above by a conventional mixing (hereinafter referred to as "one-step mixing").

The reason why the rubber ingredients used in the first mixing step of the process of this invention necessarily contain at least 50% by weight of the total of the halogenated butyl rubber (1) and the polybutadiene rubber (3), is to prevent the resulting tire treads from decreasing in wear resistance although these treads will have high resilience as compared with those produced by the conventional one-step mixing process.

The reason why the amount of the rubber ingredients to be mechanically mixed with at least 90% by weight of the total of the carbon black in the first mixing step according to this invention is limited to 40-70 parts by weight, is as follows. If less than 40 parts by weight of the rubber ingredients are incorporated at a time with the carbon black of that amount and then mixed together in a conventionally-used closed type mixer or roll mill, then a homogeneous mixed mass will be difficult to obtain, much heat will tend to be generated during the mechanical mixing and the carbon black will not uniformly be dispersed in the rubber ingredients whereby the resulting tire treads have unexpectedly unsatisfactory wear resistance. If, on the other hand, more than 70 parts by weight of the rubber ingredients are used in the first mixing step, then the concentration of the carbon black in the rubber ingredients will be too low whereby the effects of this invention are not appreciably exhibited and the resulting tire treads have little improved resilience. When the rubber ingredients and carbon black are mechanically mixed together in the first mixing step, up to 30 parts by weight of a process oil may, if desired, be added thereto to facilitate the mixing operation. However, if more amounts of the process oil are used, then the merits of this invention will be lost.

The halogenated butyl rubber (1) used herein preferably includes a chlorinated butyl rubber (chlorine content: 1.0-1.5% by weight), a brominated butyl rubber (bromine content: 1.8-2.0% by weight) or a mixture thereof. The polyisoprene rubber (2) used herein includes one containing at least 90% of cis-1,4-bonding units. The polybutadiene rubber (3) used herein includes one containing up to 20% of 1,2-bonding units.

The preferable quantitative ranges in which the rubber ingredients (1), (2) and (3) are used, are such that the resulting tire treads have highly improved rolling resistance and satisfactory wet skid resistance without appreciable degradation in wear resistance as disclosed in Japanese Patent Application No. 42011/79. More particularly, the halogenated butyl rubber (1) may preferably be used in an amount by weight of 5-30 parts, natural rubber or the polyisoprene rubber (2) in an amount by weight of up to 95 parts and the polybutadiene rubber (3) in an amount which is at least 50 parts by weight less than 10 times the amount of the halogenated butyl rubber (1) used and is at most 20 parts by weight less than the amount of the halogenated butyl rubber (1). These preferable ranges are as shown in FIG. 1. Assuming that the ranges of amount of the rubbers (1), (2) and (3) used are represented by the symbols z, x and y respectively, relationships between these symbols can be established as indicated by the following formulae:

$$95 \geq x > 0 \tag{1}$$

$$30 \geq z \geq 5 \tag{2}$$

$$y \leq 10z - 50 \tag{3}$$

$$y \geq z - 20 \tag{4}$$

$$x + y + z = 100 \tag{5}$$

The ranges of amount used which are specified by the above formulae (1) to (5), are preferable ones for the rubber ingredients in accordance with this invention. In addition, the preferable ranges of amount of the rubber ingredients used herein are partly covered by those disclosed in said Japanese Patent Application No. 42011/79.

The halogenated butyl rubber (1) may preferably be used in an amount by weight of 5-30 parts (formula (2)) as mentioned above. Formula (3) indicates the critical value for wet skid resistance; if the amount of the polybutadiene rubber (3) used exceeds said critical line, then this will result in producing tire treads having unsatisfactory wet skid resistance although they have improved wear resistance. The larger the amount of the halogenated butyl rubber used is, the lower the resilience and wear resistance of the resulting tire treads are. The use of the halogenated butyl rubber (1) in an amount by weight of more than 30 parts will not remarkably increase the wet skid resistance in the resulting tire treads considering the increase in the amount of the rubber (1) used while it will decrease the wear resistance and resilience, and, thus, the use of such too much rubber (1) is unsuitable for the purpose of decreasing the rolling resistance in the resulting tire treads.

Natural rubber, the polyisoprene rubber containing at least 90% of cis-1,4-bonding units, or a mixture thereof (2) used in this invention, may preferably be used in an amount by weight of up to 95 parts of the total of the rubber ingredients (1) to (3) as previously mentioned. Under such conditions that only the formulae (2) and (3) are satisfied, the resilience of the resulting tire treads will depend mainly on the amount of the rubber (2) used, that is, the resilience will improve in the resulting tire treads as the amount of the rubber (2) increases. The use of the rubber (2) in an amount by weight of more than 95 parts will disadvantageously result in decreasing the wet skid resistance in the resulting tire treads.

The amount of the polybutadiene (3) used will vary depending on the amount of the halogenated butyl rubber (1) used and it is in the range indicated by the formulae (3) and (4), and particularly in the range indicated by the formula (4) a remarkable decrease in wear resistance in the resulting tire treads will be inhibited if the halogenated butyl rubber (1) is used in the higher portion of the specified amount.

The carbon black used in this invention may preferably have an average particle size of up to 40 m$\mu$. The use of carbon black having an average particle size larger than the above one is undesirable since it results in decreasing the wear resistance in the resulting tire treads. Further, the amount of carbon black added in the first mixing step may preferably be in ratios by weight of from 0.7 to 1.3, based on the total amount of the rubber ingredients used in the first mixing step. The use of carbon black in ratios of more than 1.3 will make if difficult to mechanically mix the carbon black with the rubber ingredients in a conventional mixer, while the use thereof in ratios of less than 0.7 will result in resilience, wet skid resistance and wear resistance of cured products obtained from the rubber compositions and FIGS. 4-1, 4-2, 4-3 and 4-4 are each a part of triangular graph showing the relationships between the constitution of the rubber ingredients used in the first step of the two-step mixing process of Examples or Comparative examples and the properties of cured products obtained from the rubber compositions.

Figures 1, 3:
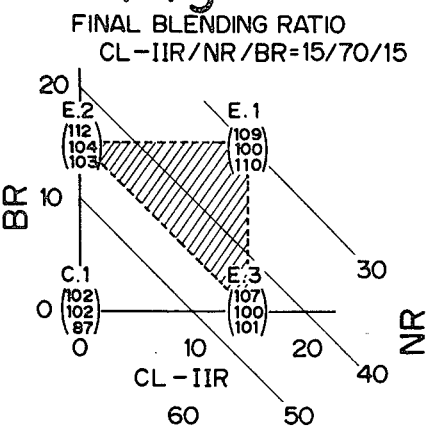
Figures 2, 3:
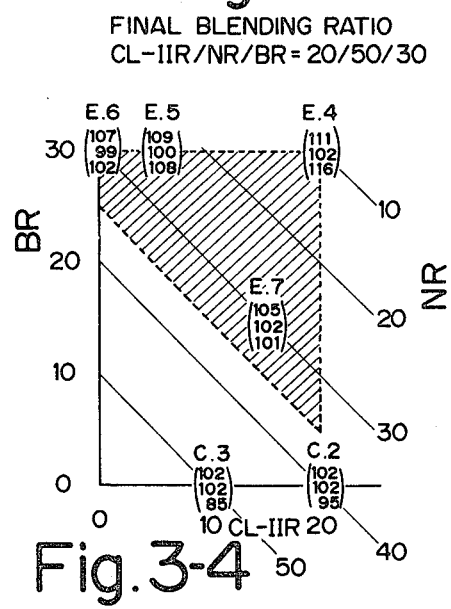
Figure 3:
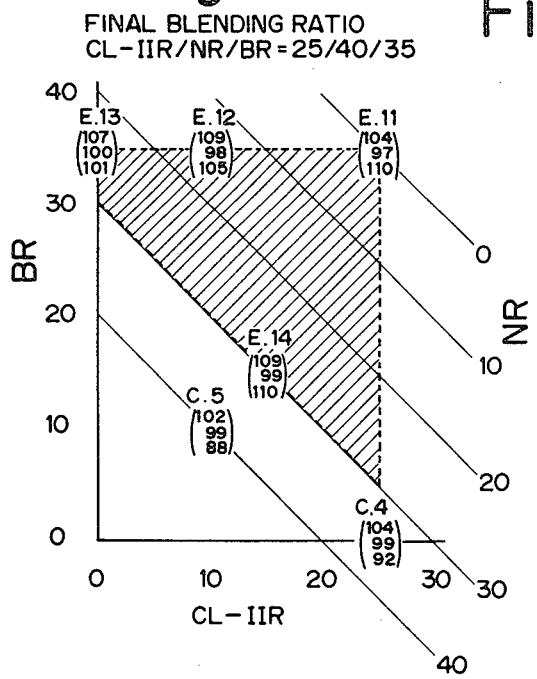
Figures 3, 4:
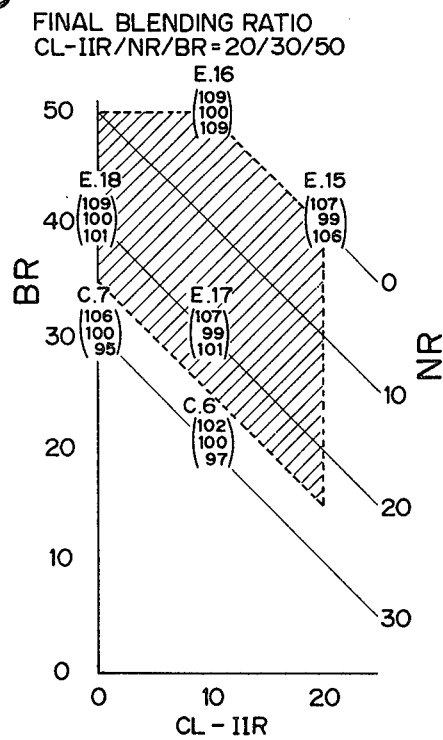

It should be noted in the accompanying drawing that "CL-IIR", "NR", "BR", "HAL-IIR" and "IR" stand respectively for chlorinated butyl rubber, natural rubber, polybutadiene rubber, halogenated butyl rubber and polyisoprene rubber in the downward order, that the "three numeral values" in each group parenthesized in FIGS. 3-1 to 3-4 respectively indicate the index expressions of Lüpke rebound (resilience) at 70° C., wet skid resistance and wear resistance (Pico abrasion), and that the "four numeral values" in each group parenthesized in FIGS. 4-1 to 4-4 respectively indicate tensile strength at break (Kg/cm²), elongation at break (%), 300% modulus (Kg/cm²) and JIS hardness in the downward order.

FIGS. 3 and 4 graphically show the constitutions of the rubber compositions used in the first step of the two-step mixing process and the properties of tire treads prepared therefrom. These Figures indicate that if the rubber compositions in Reference examples 1, 2, 3 and 4 are treated by the two-step mixing process, then they will give the same results as those prepared by the process of this invention. More specifically, in a case where the ingredients usable in this invention are mechanically mixed together by the two-step mixing process of this invention, the resulting tire treads will have improved resilience with wet skid resistance being unchanged as compared with tire treads prepared from the same ingredients by the conventional one-step mixing process. In addition, the use of at least 50% by weight of the total of the halogenated butyl rubber and polybutadiene rubber in the first mixing step of the two-step mixing process will result in the production of tire treads having improved wear resistance as compared with tire treads obtained from rubber compositions prepared by the conventional one-step mixing process. The resulting vulcanized rubbers, tire treads for example, prepared through the two-step mixing process will be somewhat low in hardness and somewhat high in 300% modulus; further, the tensile strength thereof will not substantially be influenced depending on the kind of the mixing process, whether one-step or two-step, however, the elongation at break thereof will tend to be low.

TABLE 1

| | One-Step Mixing Process | | | | |
|---|---|---|---|---|---|
| Reference example | 1 | 2 | 3 | 4 | 5 |
| Chlorinated butyl rubber[1] (1) | 15 | 20 | 25 | 20 | 20 |
| Natural rubber (RSS No. 3) (2) | 70 | 50 | 40 | 30 | 50 |
| Polybutadiene rubber (4) (3) | 15 | 30 | 35 | 50 | 30 |
| Carbon black (N 339) | 60 | 60 | 60 | 60 | 50 |
| Aromatic oil | 12 | 12 | 12 | 12 | 5 |
| Zinc oxide | 5 | | | | |
| Stearic acid | 2 | | | | |
| Anti-aging agent (6) | 1 | " | " | " | " |
| Vulcanization accelerator | 0.8 | | | | |
| Sulphur | 2.0 | | | | |
| [Properties of cured products] | | | | | |
| Resilience (Lupke Rebound) (70° C.) | 57 | 57 | 55 | 54 | 62 |
| Wet skid resistance (8) | 83 | 84 | 87 | 83 | 83 |
| Pico abrasion ($\times 10^{-2}$ c.c.) (9) | 2.38 | 2.23 | 2.30 | 1.90 | 2.20 |
| Tensile strength (Kg/cm²) | 207 | 197 | 192 | 185 | 197 |
| Elongation (%) | 450 | 440 | 445 | 440 | 480 |
| 300% modulus (Kg/cm²) | 131 | 130 | 124 | 118 | 110 |
| Hardness (JIS) | 65 | 65 | 65 | 65 | 65 | producing a low concentration of carbon black in the rubber ingredients whereby a resilience improving effect is lessened.

The carbon black used in the process of this invention amounts to 40–70 parts by weight as previously mentioned. If the whole (40–70 parts by weight) of carbon black is used in the first mixing step then the maximum resilience improving effect will be obtained, however, less than 10% of the whole of carbon black may alternatively be used with the remainder of the rubber ingredients in the second mixing step. If, on the other hand, less than 90% of the whole of carbon black is used in the first mixing step, then the resilience will not sufficiently be improved in the resulting tire treads (Comparative example 8).

The first mixing step in accordance with this invention is used to mechanically mix the rubber ingredients and carbon black to once obtain a dispersion of the carbon black at a high concentration in the rubber ingredients. To obtain such a dispersion, the carbon black may be wholly added at a time to the rubber ingredients for mechanically mixing them together in a closed type mixer or open roll, or it may be added in several portions thereto to gradually increase the concentration of carbon black in the rubber ingredients. After the dispersion of carbon black at the desired high concentration has once been obtained in the mixer, it may continuously be incorporated and mechanically mixed with the remaining rubber ingredients and carbon black. This latter step corresponds to the second mixing step and is within the scope of this invention. It is unsuitable, however, if a carbon master batch prepared without mechanical mixing, such as a wet carbon master batch, is incorporated with the remaining rubber ingredients in a second mixing step. In a case where a wet carbon master batch is to be used, it is also required that this batch be treated by mechanical mixing and be then incorporated with the remaining material in a second mixing step.

The process oil which may be used in this invention if desired, may be added in an amount by weight of up to 30 parts, preferably up to 20 parts. It is generally recommendable not to add the process oil in order to increase the resilience in the resulting tire treads. However, in order not to raise problems as to high-temperature heat generation and the like in the first mixing step, up to 30, preferably up to 20, parts by weight of the process oil may be added or may be added in the form of oil extended rubber.

The rubber compositions of this invention may, as desired, be incorporated with additives which are widely used in the rubber industry, such as zinc oxide, a vulcanization accelerator, an activator, a process oil and an anti-aging agent.

The rubber compositions prepared by the two-step mixing in accordance with this invention may be shaped and cured by conventional methods to produce tire treads therefrom.

This invention will be better understood by the following Examples in comparison with the following Reference examples and Comparative examples.

Examples 1–22, Reference examples 1–5 and Comparative examples 1–8

Various rubber compositions for tire treads were prepared from the rubber ingredients and additives by mixing them together in a small-sized Banbury mixer (vol.: 1.7 l) as shown in Tables 1 and 2, and the thus prepared compositions of this invention (Examples) were compared with the thus prepared conventional compositions (Reference examples and Comparative examples) to substantiate the effects or advantages of the former over those of the latter. In the first mixing step, the Banbury mixer was controlled so that the initial temperature of the side wall of the mixer was 60° C., the rotor was operated at 40 r.p.m. and the jacket of the mixer kept the mixing temperature at 110°–120° C. In this first step, a part of the rubber ingredients was supplied to the Banbury mixer where they were mixed together for 30 seconds, after which the carbon black and other additives were supplied to the mixer and mixed together for 5 minutes therein to obtain a firstly mixed mass. In the second mixing step, the thus obtained firstly mixed mass was wound around an 8-inch roll heated to 60° C., mixed with the remainder of the rubber ingredients for 10 minutes and further mixed with the vulcanization accelerator and sulphur for 4 minutes on the roll thereby to obtain rubber compositions in the form of about 3.0 mm thick sheets. The rubber composition sheets so obtained were vulcanized or cured with a press at 160° C. for 20 minutes and then tested for resilience (Lüpke Rebound test at 70° C.), wet skid value, Pico abrasion loss (Goodrich type Pico abrasion test) and tensile strength (JIS K 6301).

Table 1 indicates rubber compositions prepared from the same ingredients respectively as in Examples A Group, B Group, C Group, D Group and E Group by the use of a one-step mixing process as well as the properties of tire treads prepared from said rubber compositions (Reference examples).

Table 2 indicates rubber compositions prepared from ingredients usable in this invention by the two-step mixing process of this invention as well as the properties of tire treads prepared from said rubber compositions.

It is seen from Table 2 that the tire treads obtained by the two-step mixing process in Examples 1–3 (A Group) corresponding to Reference example 1 have high resilience and 300% modulus as well as low hardness as compared with that obtained by the one-step mixing process in Reference example 1. The wet skid resistance is not influenced by a mixing process, whether one-step or two-step. With respect to the two-step mixing process of this invention, the wear resistance of the resulting tire treads will depend on the composition of rubber ingredients used in the first mixing step. In a case where at least 50% by weight of the total of the chlorobutyl rubber and polybutadiene rubber is used in the first mixing step, the resulting tire treads will be improved in wear resistance better than those obtained from rubber compositions prepared by the conventional one-step process; however, the use of less than 50% by weight thereof will tend to exhibit adverse effects.

Figure 2:
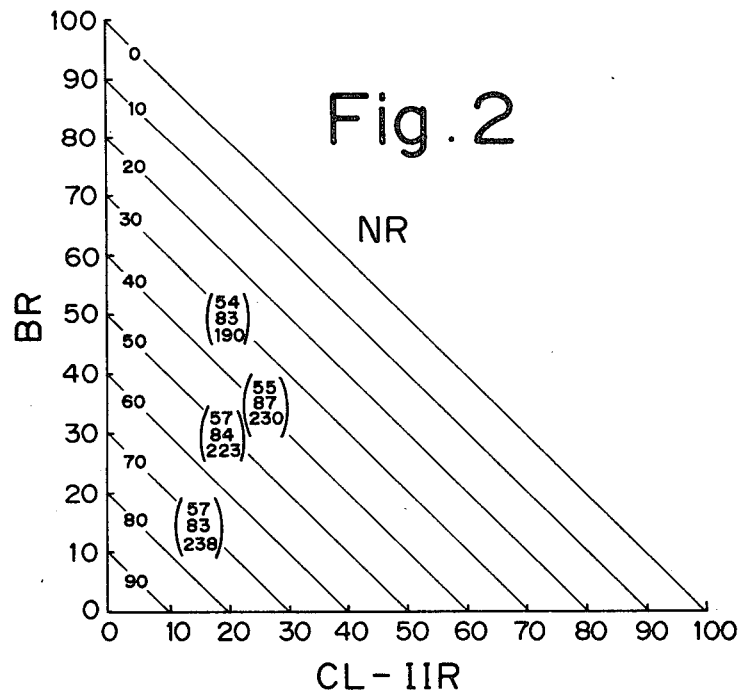

FIG. 1 is a triangular graph showing the preferable range of ratio in which rubber ingredients usable in this invention are blended, FIG. 2 is a triangular graph showing the relationship between the constitution of the rubber ingredients of rubber compositions prepared by a conventional one-step mixing process and the resilience, wet skid resistance and wear resistance (Pico abrasion loss multiplied by $10^4$ c.c.) of cured products obtained from the rubber compositions, FIGS. 3-1, 3-2, 3-3 and 3-4 are each a part of triangular graph showing the relationships between the constitution of the rubber ingredients used in the first step of the two-step mixing process of this invention and the

TABLE 2

Two-Step Mixing Process

| Halogenated Natural rubber butyl /or polyisoprene/Polybutadiene rubber rubber | 15/70/15 (A Group) | | | | | | 20/50/30 (B Group) | | | | | | 25/40/35 (C Group) | | | | | |
|---|---|---|---|---|---|---|---|---|---|---|---|---|---|---|---|---|---|---|
| | E. | | | | | C. | E. | | | | | C. | E. | | | | | C. |
| Example or Comparative example | 1 | 2 | 3 | 1 | 4 | 5 | 6 | 7 | 2 | 3 | 8 | 9 | 10 | 11 | 12 | 13 | 14 | 4 | 5 |
| [First mixing step] | | | | | | | | | | | | | | | | | | | |
| Chlorinated butyl rubber (1) (1) | 15 | — | 15 | — | 20 | 5 | — | 15 | 20 | 10 | — | 20 | 20 | 25 | 10 | — | 15 | 25 | 10 |
| Brominated butyl rubber (2) (1) | — | 15 | — | — | — | — | — | — | — | — | 20 | — | — | — | — | 25 | — | — | — |
| Natural rubber (RSS No. 3) (2) | — | 45 | 45 | 60 | 10 | 25 | 30 | 30 | 40 | 50 | 10 | — | 10 | — | 15 | 25 | 30 | 35 | 40 |
| Polyisoprene rubber (3) (2) | 30 | — | — | — | — | — | — | — | — | — | — | 10 | — | — | — | — | — | — | — |
| Polybutadiene rubber 1 (4) (3) | 15 | 15 | — | — | 30 | 30 | 30 | 15 | — | — | 30 | 30 | 30 | 35 | 35 | 35 | 15 | — | 10 |
| Polybutadiene rubber 2 (5) (3) | — | — | — | — | — | — | — | — | — | — | — | — | — | — | — | — | — | — | — |
| Carbon black (N 339) | 60 | " | " | " | " | " | " | " | " | " | " | " | " | 60 | " | " | " | " | " |
| Aromatic oil | 12 | | | | | | | | | | | | | 12 | | | | | |
| Zinc oxide | 5 | | | | | | | | | | | | | 5 | | | | | |
| Stearic acid | 2 | | | | | | | | | | | | | 2 | | | | | |
| Anti-aging agent (6) | 1 | | | | | | | | | | | | | 1 | | | | | |
| [Second mixing step] | | | | | | | | | | | | | | | | | | | |
| Chlorinated butyl rubber (1) | — | — | — | 15 | — | 15 | 20 | 5 | — | 10 | — | — | — | — | 15 | 25 | 10 | — | 15 |
| Natural rubber (RSS No. 3) (2) | 40 | 25 | 25 | 10 | 40 | 25 | 20 | 20 | 10 | — | 40 | 40 | 40 | 40 | 25 | 15 | 10 | 5 | — |
| Polyisoprene rubber (2) | — | — | 15 | 15 | — | — | — | — | — | — | — | — | — | — | — | — | — | — | — |
| Polybutadiene rubber 1 (3) | — | — | — | — | — | — | — | 15 | 30 | 30 | — | — | — | — | — | — | 20 | 35 | 25 |
| Carbon black (N 339) | — | — | — | — | — | — | — | — | — | — | — | — | — | — | — | — | — | — | — |
| Vulcanization accelerator (7) | 0.8 | " | " | " | " | " | " | " | " | " | " | " | " | 0.8 | " | " | " | " | " |
| Sulphur | 2.0 | | | | | | | | | | | | | 2.0 | | | | | |
| [Properties of cured products] | | | | | | | | | | | | | | | | | | | |
| Resilience (Lupke rebound) (70° C.) (10) | 109 | 112 | 107 | 102 | 111 | 109 | 107 | 105 | 102 | 102 | 105 | 107 | 105 | 104 | 109 | 107 | 109 | 104 | 102 |
| Wet skid resistance (11) | 100 | 104 | 100 | 102 | 102 | 100 | 99 | 102 | 102 | 102 | 102 | 102 | 104 | 97 | 98 | 100 | 99 | 99 | 99 |
| Wear resistance (Pico abrasion) (12) | 110 | 103 | 101 | 87 | 116 | 108 | 102 | 101 | 95 | 85 | 122 | 111 | 115 | 110 | 105 | 101 | 110 | 92 | 88 |
| Tensile strength (Kg/cm²) | 224 | 209 | 224 | 210 | 196 | 194 | 189 | 196 | 195 | 196 | 221 | 201 | 198 | 183 | 184 | 176 | 187 | 167 | 192 |
| Elongation (%) | 450 | 395 | 400 | 380 | 370 | 375 | 440 | 415 | 410 | 400 | 400 | 370 | 420 | 385 | 355 | 375 | 385 | 325 | |
| 300% modulus (Kg/cm²) | 140 | 147 | 144 | 150 | 144 | 148 | 141 | 123 | 136 | 130 | 153 | 148 | 143 | 120 | 135 | 141 | 141 | 128 | 148 |
| Hardness (JIS) | 61 | 60 | 60 | 60 | 63 | 63 | 61 | 59 | 61 | 61 | 62 | 62 | 62 | 61 | 63 | 63 | 63 | 63 | 64 |

| Halogenated Natural rubber butyl /or polyisoprene/Polybutadiene rubber rubber | 20/30/50 (D Group) | | | | 20/50/30 (E Group) | | | 20/50/30 (F Group) | |
|---|---|---|---|---|---|---|---|---|---|
| | E. | | | C. | E. | | C. | C. | E. |
| Example or Comparative example | 15 | 16 | 17 | 18 | 6 | 7 | 19 | 20 | 21 | 8 | 22 |
| [First mixing step] | | | | | | | | | | | |
| Chlorinated butyl rubber (1) (1) | 20 | 10 | 10 | — | 10 | — | 20 | 20 | 20 | 20 | 20 |
| Brominated butyl rubber (2) (1) | — | — | — | — | — | — | — | — | — | — | — |
| Natural rubber (RSS No. 3) (2) | — | — | 20 | 20 | 30 | 30 | — | — | 20 | 10 | 10 |
| Polyisoprene rubber (3) (2) | — | — | — | — | — | — | — | — | — | — | — |
| Polybutadiene rubber 1 (4) (3) | 40 | 50 | 30 | 40 | 20 | 30 | 30 | 30 | 30 | 30 | 30 |
| Polybutadiene rubber 2 (5) (3) | " | " | " | " | " | " | " | " | " | " | " |
| Carbon black (N 339) | | | | | | | | | | | |
| Aromatic oil | | | | | | | | | | | |
| Zinc Oxide | | | | | | | | | | | |
| Stearic acid | | | | | | | | | | | |

TABLE 2-continued

Two-Step Mixing Process

| | | | | | | | | | | | |
|---|---|---|---|---|---|---|---|---|---|---|---|
| Anti-aging agent (6) | — | — | — | — | — | — | — | — | — | — | — |
| [Second mixing step] | | | | | | | | | | | |
| Chlorinated butyl rubber (1) | — | — | — | — | — | — | — | — | — | — | — |
| Natural rubber (RSS No. 3) (2) | — | 10 | — | 20 | 10 | 20 | — | — | — | — | — |
| Polyisoprene rubber (2) | 10 | 30 | 10 | 10 | — | — | 50 | 50 | 30 | 40 | 40 |
| Polybutadiene rubber 1 (3) | 30 | — | 10 | — | 30 | 20 | — | — | — | — | — |
| Carbon black (N 339) | — | — | 20 | — | — | — | — | — | — | — | — |
| Vulcanization accelerator (7) | 10 | — | — | — | 30 | 20 | — | — | — | — | — |
| Sulphur | " | " | " | " | " | " | " | " | " | 9 | 3 |
| | | | | | | | | | | " | " |
| [Properties of cured products] | | | | | | | | | | | |
| Resilience (Lupke rebound) (70° C.) (10) | 107 | 109 | 107 | 109 | 102 | 106 | 110 | 105 | 105 | 105 | 107 |
| Wet skid resistance (11) | 99 | 100 | 99 | 100 | 100 | 100 | 101 | 102 | 102 | 101 | 102 |
| Wear resistance (Pico abrasion) (12) | 106 | 109 | 101 | 101 | 97 | 95 | 112 | 109 | 117 | 110 | 115 |
| Tensile strength (Kg/cm²) | 172 | 168 | 170 | 165 | 165 | 160 | 197 | 198 | 198 | 197 | 196 |
| Elongation (%) | 430 | 410 | 425 | 390 | 420 | 390 | 395 | 385 | 410 | 400 | 390 |
| 300% modulus (Kg/cm²) | 101 | 113 | 108 | 123 | 130 | 155 | 125 | 140 | 135 | 135 | 140 |
| Hardness (JIS) | 61 | 63 | 63 | 62 | 63 | 63 | 62 | 63 | 63 | 64 | 63 |

Notes:
E. = Example
C. = Comparative example
(1) Chlorinated butyl HT-10-66 (Enjay Co.)
(2) Polysar bromobutyl × 2 (Polysar Co.)
(3) Nipol IR 2200 (Nippon Zeon Co.)
(4) Nipol BR 1220 (Nippon Zeon Co.)
(5) Diene NF 35R (Asahi Kasei Kogyo Co.)
(6) N-(1,3-dimethylbutyl)-N'-phenyl-p-phenylenediamine
(7) N-oxydiethylenebenzothiazole-2-sulphenamide
(8) Measured by British Portable Skid Tester supplied by Stanley Co., at 25° C. according to ASTM E303-74, using "safety walk", outdoor type B, produced by 3M Co., as the road (surface).
(9) Goodrich type Pico abrasion tester ASTM D-2228
(10) Index expression:

$$\text{Lupke rebound (70° C.) of product obtained from rubber composition prepared by new two-step mixing process} \over \text{Lupke rebound (70° C.) of product obtained from the same rubber composition prepared by conventional one-step mixing process} \times 100$$

(11) Index expression:

$$\text{Wet skid resistance of product obtained from rubber composition prepared by new two-step mixing process} \over \text{Wet skid resistance of product obtained from the same rubber composition prepared by conventional one-step mixing process} \times 100$$

(12) Index expression:

$$\text{Pico abrasion loss of product obtained from rubber composition prepared by conventional one-step mixing process} \over \text{Pico abrasion loss of product obtained from rubber composition prepared by new two-step mixing process} \times 100$$

Experiments

Steel radial tires of 165 SR 13 size were prepared using steel cords for the belt portion, polyester cords for the carcass and each of the rubber composition obtained in Reference examples 1, 2 and Examples 1, 4, to make comparative tests on the thus prepared steel radial tires in order to substantiate the superiority of the tires in accordance with this invention to the conventional ones.

The tires so prepared were tested for rolling resistance and wet braking frictional coefficient under the following conditions. The results are as shown in Table 3.

Measurement for rolling resistance:

Test tires were tested for rolling resistance on a 1707-mm diameter drum with an inflation pressure of 1.9 Kg/cm$^2$ and a load of 420 Kg in these experiments.

The test tires were preliminarily run at a speed of 100 Km/hr for 30 minutes, after which they were tested for rolling resistance three times at each of speeds of 40 Km/hr, 60 Km/hr, 80 Km/hr and 100 Km/hr. The three values obtained at each of the speeds were averaged to obtain the mean value. Further, the means values so obtained were simply averaged to obtain the mean value at the speed between 40 Km/hr and 100 Km/hr.

Measurement for wet braking frictional coefficient:

The test tires were tested three times for wet braking frictional coefficient on an asphalt-surfaced road by the trailer system (the test being made at 40 Km/hr and 80 Km/hr). The values so obtained at each of the speeds were averaged.

The tires prepared in Examples 1 and 4 exhibited rolling resistance 8% lower than those prepared in Reference examples 1 and 2, but the former exhibited substantially the same wet braking frictional coefficient as the latter.

In the Examples wear resistance was not evaluated by actually running the tires, however, Pico abrasion tests were made. It is known that Pico abrasion tests may be used to predict the wear resistance of tires for passenger cars. Thus, the Pico abrasion tests would reasonably be substituted for the tests by actually running the tires.

TABLE 3

Rolling Resistance and Wet Braking frictional coefficient

| | Rolling resistance Mean value (Kg) at speed of 40-100 Km/hr | Wet braking frictional coefficient | |
|---|---|---|---|
| | | 40 Km/hr | 80 Km/hr |
| Reference example 1 | 2.50 | 0.58 | 0.55 |
| Reference example 2 | 2.45 | 0.59 | 0.53 |
| Example 1 | 2.31 | 0.60 | 0.53 |
| Example 4 | 2.27 | 0.58 | 0.54 |

As mentioned above, the new tire treads obtained from the rubber compositions prepared by the process of this invention have remarkably more improved resilience than the conventional tire treads while maintaining wet skid resistance and wear resistance at a level which is the same as, or higher than, the said conventional tire treads. These advantages of the new tire treads are particularly attributable to the addition of carbon black to the rubber ingredients in a specified ratio in the first step of the two-step mixing process and to the specified combined use of the rubber components (1), (2) and (3).

What is claimed is:

1. In a process for preparing a rubber composition for tire treads by incorporating 100 parts by weight of the total of rubber material consisting of:
   (1) at least one member selected from halogenated butyl rubbers,
   (2) at least one member selected from the group consisting of natural rubber and a polyisoprene rubber and
   (3) a polybutadiene rubber with 40-70 parts by weight of carbon black and with a vulcanization accelerator, sulphur and other additives, and then mechanically mixing the resulting mixture to obtain the rubber composition, the process characterized by mechanically mixing in the first mixing step 40-70 parts by weight of the rubber material containing at least one member selected from the group consisting of the halogenated butyl rubber (1) and the polybutadiene rubber (3), in an amount of at least 50% by weight of the total of the rubbers (1) and (3) with the proviso that, in cases where the amount of said at least one member contained in said rubber material is less than 40-70 parts by weight, the rubber (2) is added in such an amount that the amounts of the rubbers (1), (2) and (3) total 40-70 parts by weight, with at least 90% by weight of the total of the carbon black and then mechanically mixing the resulting mixture with the remainder of the rubber material and carbon black in the second mixing step thereby to obtain a desired rubber composition for producing therefrom tire treads having low rolling resistance and high wet skid resistance with acceptable wear resistance.

2. A process according to claim 1, wherein the rubber material is incorporated and mechanically mixed with the carbon black in a ratio by weight of from 1:0.7 to 1:1.3 in the first mixing step.

3. A process according to claim 1 or 2, wherein the final rubber material after the second mixing step contains
   (1) the halogenated butyl rubber in an amount by weight of 5-30 parts,
   (2) at least one member selected from the group consisting of natural rubber and the polyisoprene rubber, in an amount by weight of up to 95 parts and
   (3) the polybutadiene rubber in an amount which is at least 50 parts by weight less than 10 times the amount of the halogenated butyl rubber and is at most 20 parts by weight less than the amount of the halogenated butyl rubber.

* * * * *